(12) United States Patent
Burdsall et al.

(10) Patent No.: US 7,985,068 B2
(45) Date of Patent: Jul. 26, 2011

(54) GAS APPLIANCE

(75) Inventors: Thomas A. Burdsall, Huntersville, NC (US); Michael R. Johnston, Troutman, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 492 days.

(21) Appl. No.: 12/113,449

(22) Filed: May 1, 2008

(65) Prior Publication Data

US 2008/0271798 A1    Nov. 6, 2008

Related U.S. Application Data

(60) Provisional application No. 60/927,715, filed on May 4, 2007.

(51) Int. Cl.
  *F23D 14/28*  (2006.01)
  *F16L 37/088*  (2006.01)
(52) U.S. Cl. .......... 431/344; 285/12; 285/308; 285/321
(58) Field of Classification Search .............. 285/7, 308, 285/321; 431/344, 345
See application file for complete search history.

(56) References Cited

U.S. PATENT DOCUMENTS

| | | | | |
|---|---|---|---|---|
| 1,770,669 | A | * | 7/1930 | Martinet ........................ 285/308 |
| 2,299,643 | A | | 7/1940 | Moody |
| 2,518,895 | A | | 8/1950 | Jacobsson et al. |
| 2,860,820 | A | * | 11/1958 | Falligant ........................ 222/82 |
| 2,901,269 | A | * | 8/1959 | Rickard ........................ 285/39 |
| 3,142,498 | A | * | 7/1964 | Press .............................. 285/12 |
| 3,361,453 | A | | 7/1965 | Brown et al. |
| 3,314,696 | A | * | 4/1967 | Ferguson et al. ........ 285/148.14 |
| 3,526,933 | A | * | 9/1970 | Parr .............................. 285/420 |
| 3,612,037 | A | | 10/1971 | Spiggle |
| 3,994,674 | A | | 11/1976 | Baumann et al. |
| 4,050,722 | A | | 9/1977 | Berger et al. |

(Continued)

FOREIGN PATENT DOCUMENTS

DE    1201376    9/1965

(Continued)

OTHER PUBLICATIONS

State Intellectual Property Office, P.R. China. Second Office Action. Aug. 4, 2010. Issued in Chinese Patent Application No. 200810125858.5.

*Primary Examiner* — James M Hewitt
(74) *Attorney, Agent, or Firm* — Dennis J. Williamson; Andrew Gerschutz; Moore & Van Allen, PLLC

(57) ABSTRACT

A coupling for attaching a canister to an appliance comprises a first connector on the canister comprising screw threads and a groove and a second connector on the appliance that comprises a slip ring. The slip ring retains the canister on the appliance. An appliance comprises a canister having screw threads. A coupling connects the canister to the appliance separate from the screw threads where the coupling locks the appliance to the canister without rotating the appliance relative to the canister. The coupling locks the appliance to the canister when the canister is moved axially relative to the appliance. A canister is provided that has a connector comprising a set of screw threads for attaching the canister to a first type of appliance, and a groove for attaching the canister to a second type of appliance. A method of connecting a canister to an appliance is also provided.

15 Claims, 5 Drawing Sheets

U.S. PATENT DOCUMENTS

| | | | |
|---|---|---|---|
| 4,545,759 A * | 10/1985 | Giles et al. | 431/344 |
| 4,640,534 A * | 2/1987 | Hoskins et al. | 285/143.1 |
| 4,720,259 A | 1/1988 | Day | |
| 4,791,538 A * | 12/1988 | Prest | 362/159 |
| 4,827,921 A | 5/1989 | Rugheimer | |
| 4,863,201 A * | 9/1989 | Carstens | 285/317 |
| 5,098,241 A * | 3/1992 | Aldridge et al. | 411/433 |
| 5,104,312 A * | 4/1992 | Dowst et al. | 431/112 |
| 5,165,728 A * | 11/1992 | Mayer | 285/12 |
| 5,261,438 A | 11/1993 | Katchka | |
| 5,533,891 A | 7/1996 | Pearl, II et al. | |
| 5,653,475 A * | 8/1997 | Scheyhing et al. | 285/54 |
| 5,882,044 A * | 3/1999 | Sloane | 285/92 |
| 6,102,447 A * | 8/2000 | Aldridge | 285/305 |
| 6,505,620 B1 * | 1/2003 | Goto | 126/38 |
| 6,676,172 B2 * | 1/2004 | Alksnis | 285/319 |
| 6,733,282 B2 * | 5/2004 | Long | 431/344 |
| 6,742,814 B2 * | 6/2004 | Resmo et al. | 285/272 |
| 6,899,094 B1 * | 5/2005 | Li | 126/41 R |
| 7,134,697 B2 * | 11/2006 | Lin | 285/276 |
| 7,387,725 B2 * | 6/2008 | Choi et al. | 210/232 |
| 2001/0049078 A1 * | 12/2001 | Long | 431/100 |
| 2003/0168854 A1 * | 9/2003 | Lebreton et al. | 285/305 |
| 2008/0274434 A1 * | 11/2008 | Burdsall et al. | 431/344 |

FOREIGN PATENT DOCUMENTS

| | | |
|---|---|---|
| DE | 2555928 | 6/1977 |
| EP | 0771996 A2 | 10/1996 |
| GB | 930890 A | 10/1963 |
| WO | 2006041589 A2 | 4/2006 |

* cited by examiner

GAS APPLIANCE

This application claims the benefit of U.S. Provisional Application No. 60/927,715 filed May 4, 2007, the disclosure of which is incorporated herein in its entirety by reference.

The invention relates generally to torches or other gas fueled appliances and more particularly to a coupling for connecting a fuel canister to a torch head or other appliance.

BACKGROUND

The invention relates to torches such as propane, propylene, butane, mixed gas or MAPP fueled torches that use a source of fuel that is ignited by a spark generated by, for example, a piezoelectric igniter (collectively "torches"). Such torches are used for heating, soldering, brazing, welding and the like.

Torches are known where a fuel canister is releasably connected to a torch head by a threaded connection. Typically the canister includes external threads that threadably engage internal threads formed in the torch head. The torch head is threaded onto the canister by rotating the torch head relative to the canister multiple turns until the torch head is tightly secured to the canister. Such a connection requires multiple turns of the torch head relative to the canister which is a time consuming and relatively inconvenient process. Further it may be difficult for a user to determine when the torch head is fully tightened on the canister.

SUMMARY OF THE INVENTION

A coupling for attaching a fuel canister to an appliance comprises a first connector on the canister that comprises a first set of screw threads and a groove and a second connector on the appliance that comprises a slip ring. The slip ring is biased to engage the groove and retain the canister on the appliance. An appliance comprises a connector having first screw threads. A coupling connects the canister to the appliance separate from the first screw threads where the coupling locks the appliance to the canister without rotating the appliance relative to the canister. The coupling locks the appliance to the canister when the canister is moved axially relative to the appliance. A canister is provided that has a port. A connector is attached to the port. The connector comprises a first set of screw threads for attaching the canister to a first type of appliance, and a groove for attaching the canister to a second type of appliance. A method of connecting a canister to an appliance is also provided.

DETAILED DESCRIPTION OF EMBODIMENTS OF THE INVENTION

Figure 1:
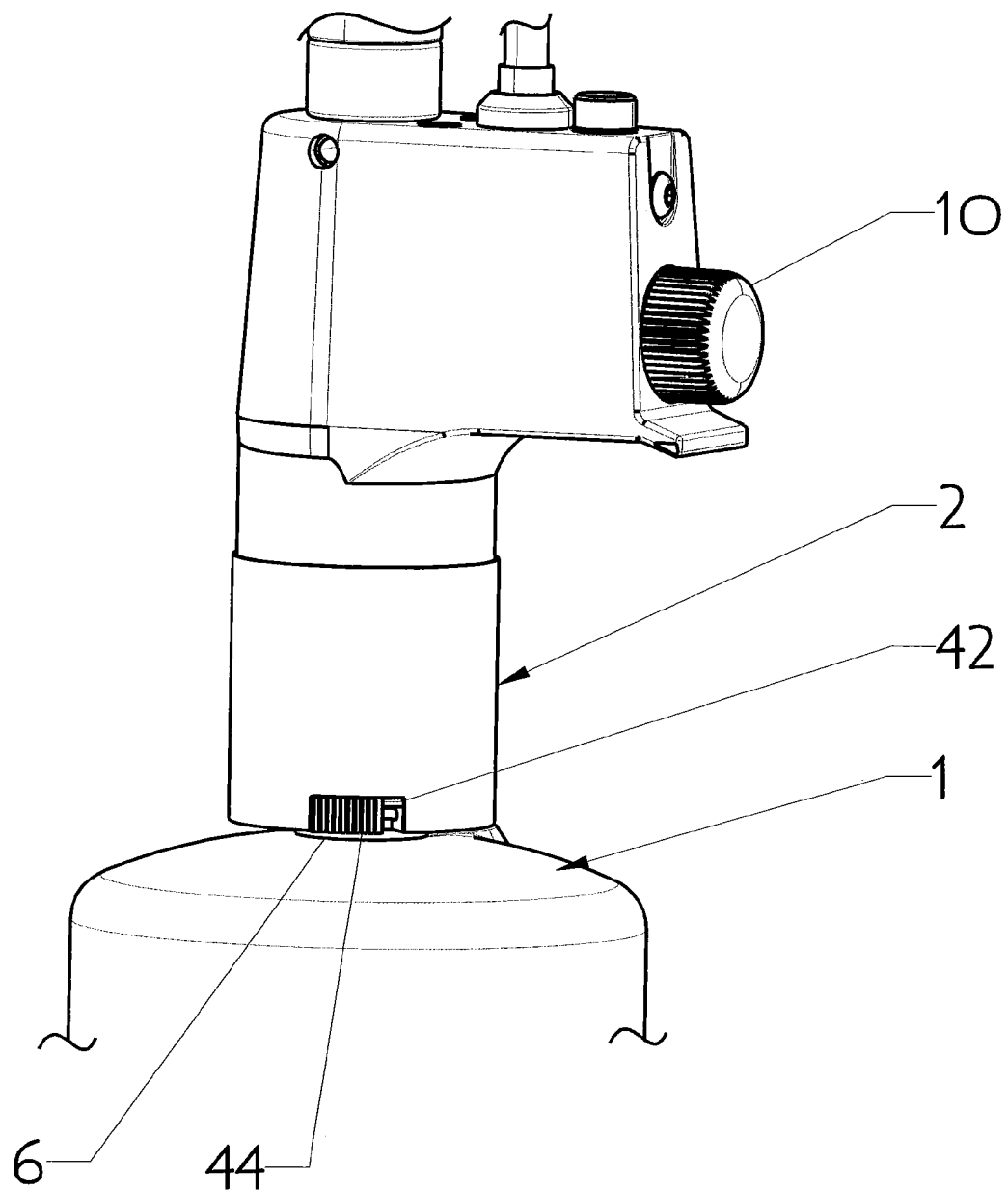
FIG. 1 is a perspective view of an embodiment of a torch head connected to a canister.
Figure 2:
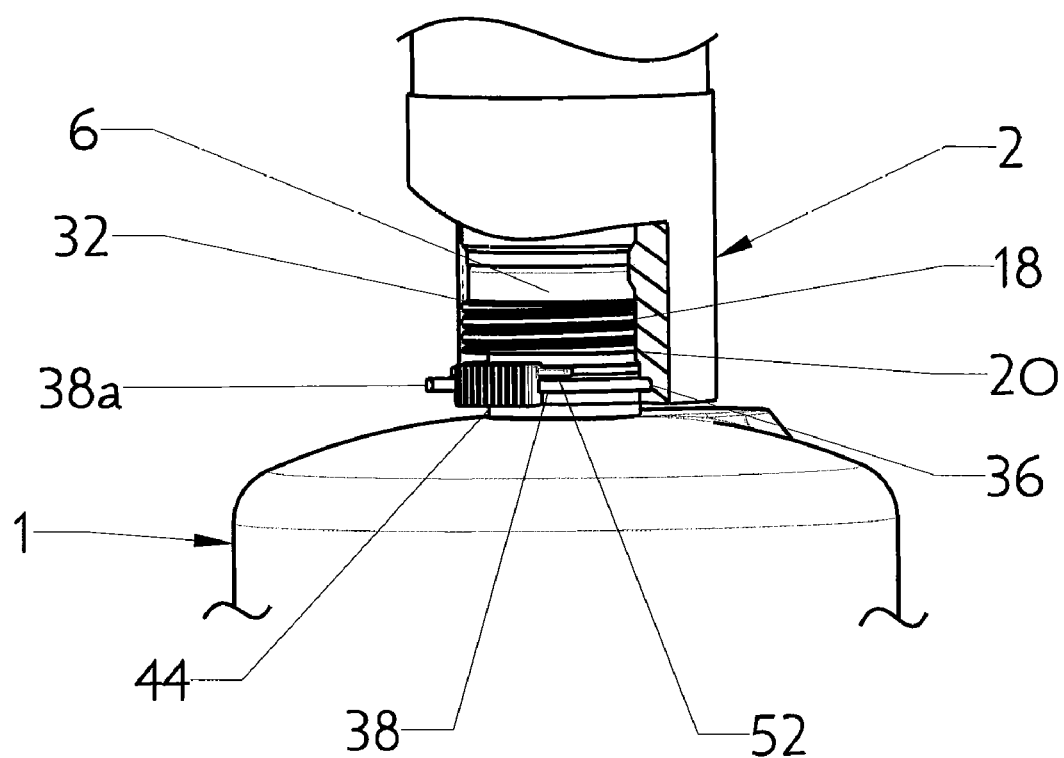
FIG. 2 is a perspective view showing the coupling between the canister and the torch head.
Figure 3:
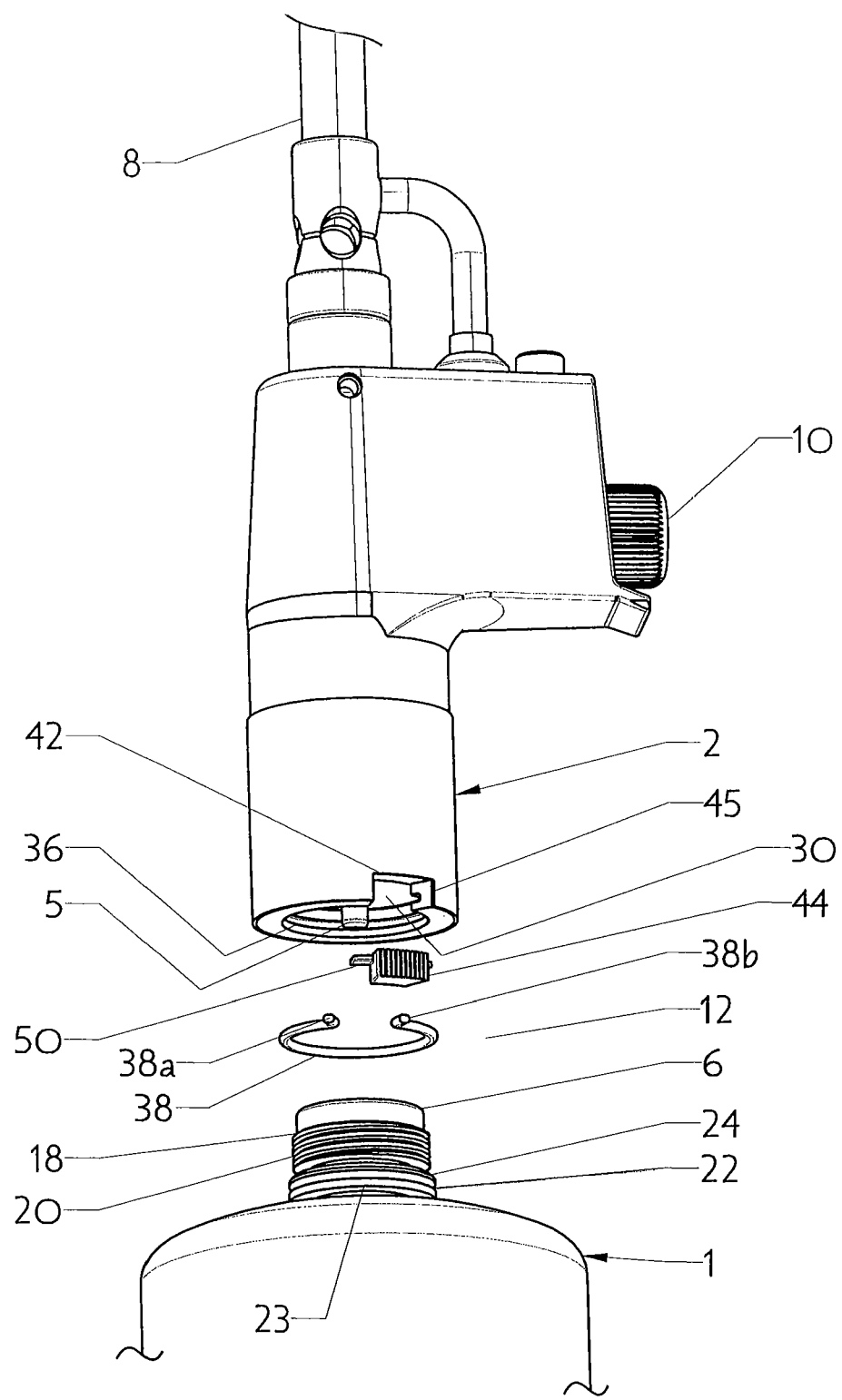
FIGS. 3 and 4 are exploded perspective views showing the coupling between the canister and the torch head.
Figure 4:
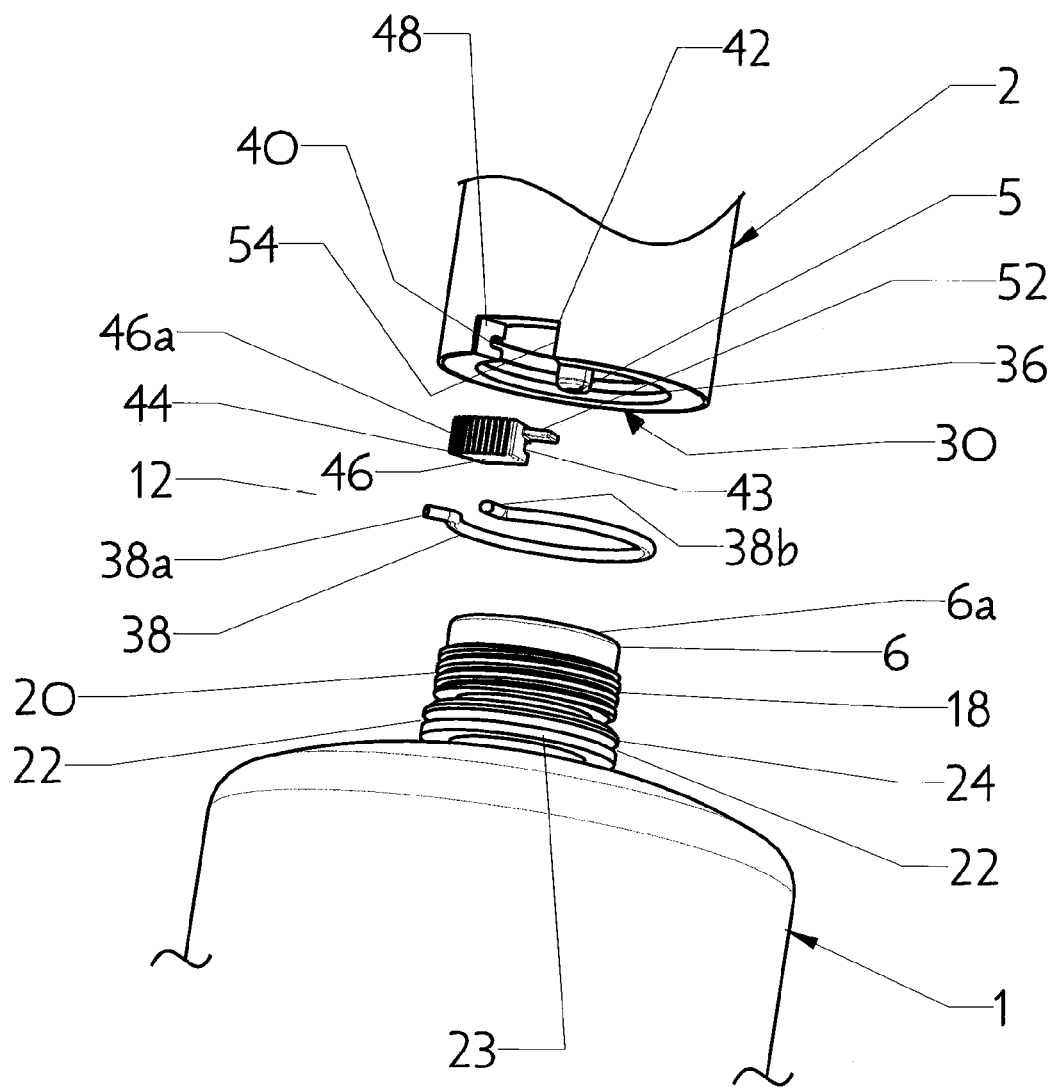
Figure 5:
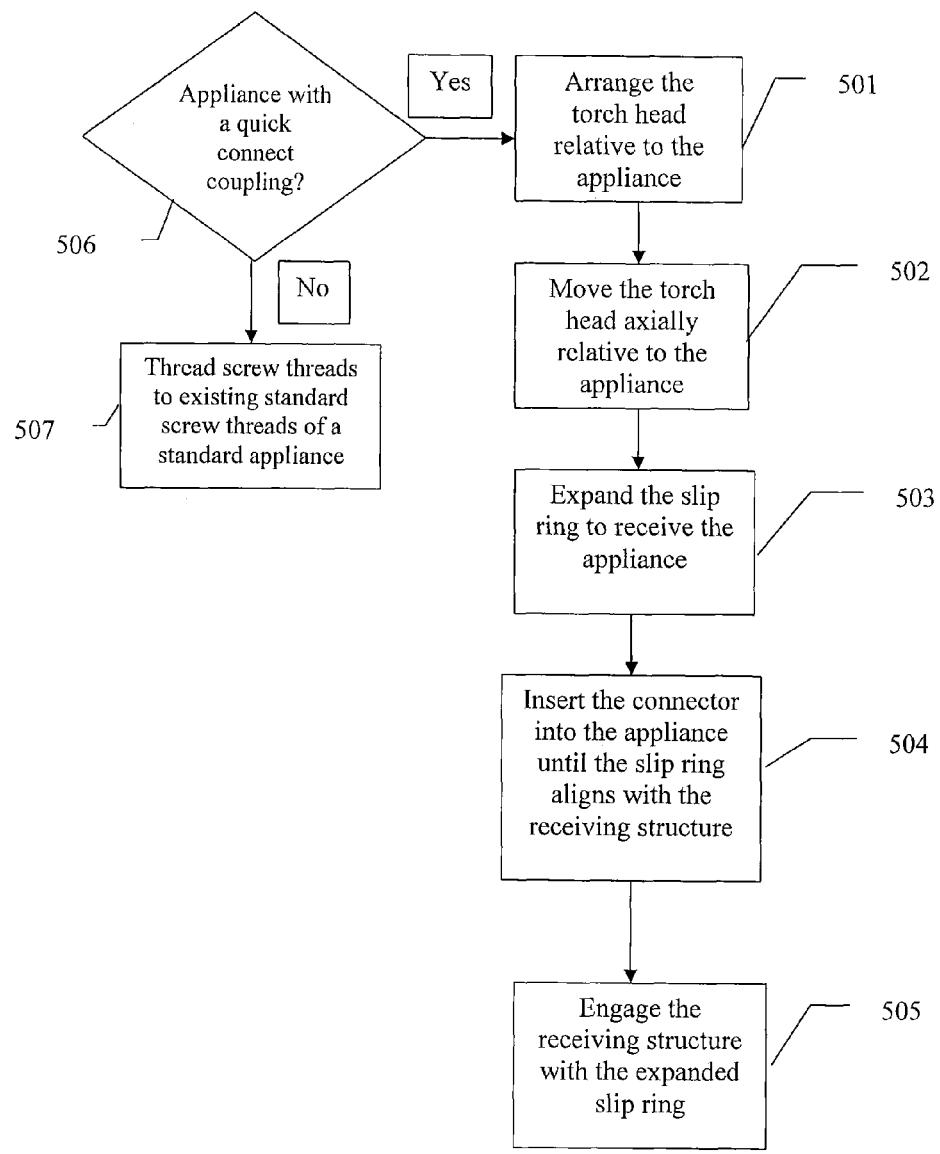
FIG. 5 is a block diagram showing an embodiment of the operation of the torch.

A quick connect coupling for attaching a fuel canister or tank 1 to an appliance such as a torch or torch head 2 is shown in the Figures. The canister 1 may contain a fuel such as propane, propylene, butane, MAPP gas, or the like. Canister 1 includes a port for communicating the interior of the canister 1 with the exterior. A first connector 6 is located in the port for connecting the canister 1 to the torch head 2 as will hereinafter be described. The torch head 2 comprises a valve assembly and fuel line 5 for controlling the flow of fuel from the canister 1 to the burn tube 8. The fuel is ignited in the burn tube 8 by, for example a piezoelectric igniter 10. A control may be provided for adjusting the flame size. A second connector 12 is secured to the end of the torch head 2 for releasably coupling to the first connector 6 as will hereinafter be described. While the invention is described herein with specific reference to a torch it will be appreciated that the coupling of the invention may be used with any appliance that releasably connects a source of fuel to the appliance. Such appliances may include but are not limited to stoves, lanterns, heaters and mosquito/insect traps where fuel sources are releasably connected to the appliance for fueling the appliance.

The connector 6 is secured in port 4 by any suitable mechanism such as welding to create a seal between the connector 6 and the canister 1. The connector 6 includes an internal bore that extends to the interior of the canister 1 and through which fuel flows during the use of the torch. A valve may be located in the bore to prevent the flow of fuel unless the torch head 2 is secured to the connector 6.

The connector 6 includes a generally cylindrical collar 18 having screw threads 20 formed thereon. Screw threads 20 are dimensioned to threadably engage mating screw threads formed on a standard torch head to allow a canister equipped with the connector 6 of the quick connect coupling of the invention to connect to a conventional torch head. A receiving structure for receiving the slip ring such as an annular groove 22 is formed around connector 6. In the illustrated embodiment, groove 22 is formed between flanges 23 and 24 although the groove may be formed between a flange and collar 18. Further, in place of the continuous annular groove the receiving structure could include interrupted flanges that that cooperate to receive the slip ring.

Torch head 2 includes an opening 30 at the end thereof for receiving connector 6. As previously described, the canister 1 fitted with the quick connect coupling may be connected to a first type of appliance or torch head having the standard threaded connection. If the appliance has a standard threaded connection (block 506), such connections are made by simply threading the screw threads 20 on the canister to mating screw threads on an existing standard torch or torch head (block 507).

Located near the end of opening 30 of the torch head 2 is a structure for receiving and retaining the slip ring such as an annular groove 36. Groove 36 is formed on an internal wall of torch 2 where the opposite ends of groove 36 terminate in a cut-out opening 42 that intersects groove 36 and communicates the interior of the torch head 2 with the exterior. Groove 36 is arranged on the torch head 2 such that it is located directly outside of and opposite to groove 22 of connector 6 when the torch head 2 is properly seated on the canister 1.

A slip ring 38 is located in groove 36. Slip ring 38 may be made of stainless steel or other strong but resilient material. Slip ring 38 is dimensioned such that when it is seated in groove 36 it extends out of groove 36 toward the interior of opening 30. One end 38a of slip ring 38 is held in a pocket 40 formed in torch head 2 adjacent the opening 42. The opposite end 38b of slip ring 38 is supported in pocket 43 of the actuator button 44.

Actuator button 44 includes a body portion 46 that is located in opening 42 such that a first end 46a of the body portion 46 is biased into engagement with one sidewall 48 of opening 42. In this position slip ring 38 is located in groove 36 but extends partially out of groove 36 towards the interior of opening 30 for the length of he slip ring. Flanges 50 and 52 extend from body portion 46 such that they are disposed behind the wall 53 of torch head 2 to trap the button 44 in the opening 42.

The button 44 can be pushed in opening 42 away from its biased position against sidewall 48 toward opposite sidewall 54. As the button is moved, the end 38b of slip ring 38 is forced away from the opposite end 38a of the slip ring to increase the effective diameter of the slip ring. Groove 36 is deep enough to accept the wider diameter of slip ring 38 as it expands.

To mount the canister 1 on a second type of torch or appliance having the mating quick connect coupling, the torch head 2 is arranged with opening 30 disposed over connector 6 (block 501). Torch head 2 is moved axially toward the canister 1 such that connector 6 enters opening 30 (block 502). As the connector 6 enters the opening, the upper edge 6a of the connector 6 contacts the slip ring 38 and forces the ends 38a and 38b of the slip ring apart thereby increasing the diameter of the slip ring 38 until it is large enough for the connector to pass through the slip ring (block 503). Edge 6a may be beveled to facilitate this camming action. Alternatively, a user may manually move button 44 to expand the slip ring 38 such that it has a diameter great enough to accept connector 6. The connector 6 is inserted axially through the opening 30 of torch head 2 without the need for relative rotation between the canister 1 and torch head 2 in either case.

Once the slip ring 38 expands, connector 6 is inserted into chamber until the groove 22 on connector 6 is aligned with the slip ring 38 (block 504). Once the groove 22 aligns with the slip ring 38, and no force is applied to move button 44, the slip ring 38 contracts back to its original diameter causing it to snap into engagement with groove 22 (block 505). In this position an inner portion of the slip ring 38 is located in groove 22 and an outer portion of slip ring 38 is located in groove 36. The engagement of the slip ring 38 with grooves 22 and 36 locks the torch head 2 to the canister 1. The fuel line 5 of torch head 2 may engage a valve located in connector 6 to allow fuel to flow from the canister to the torch head under control of the torch head.

To remove the torch head 2 from the canister 1, the button 44 is moved in opening to expand the slip ring 38. The slip ring 38 is expanded until the connector 6 can pass through the slip ring. The connector 6 is then withdrawn axially through the opening 30 of torch head 2 without the need for relative rotation between the canister 1 and torch head 2.

While embodiments of the invention are disclosed herein, various changes and modifications can be made without departing from the spirit and scope of the invention as set forth in the claims. One of ordinary skill in the art will recognize that the invention has other applications in other environments. Many embodiments are possible.

The invention claimed is:

1. A fuel canister and appliance coupling assembly, comprising:
   a canister;
   a first connector on the canister, said first connector comprising screw threads and a groove;
   an appliance having an opening;
   a second connector on the appliance, said second connector comprising a slip ring, said slip ring being biased to engage the groove, said first connector being axially insertable into the opening without rotating the screw threads relative to the opening such that the engagement of the slip ring with the groove retains the canister on the appliance with the screw threads being located in the opening.

2. The coupling of claim 1 wherein the second connector includes a second groove formed on an internal wall of the appliance.

3. The coupling of claim 2 wherein the slip ring is seated in the second groove.

4. The coupling of claim 3 wherein the slip ring is dimensioned such that when it is seated in the second groove it extends out of the second groove toward the interior of a second opening.

5. The coupling of claim 1 wherein the second groove is located on the appliance such that it is positioned opposite said groove when the appliance is properly seated on the canister.

6. The coupling of claim 1 wherein the slip ring is made of a resilient material.

7. The coupling of claim 1 wherein a first end of the slip ring is supported by an actuator button that is exposed on the exterior of the appliance.

8. The coupling of claim 7 wherein a second end of the slip ring is supported by the appliance.

9. The coupling of claim 7 wherein the actuator button is moved to increase the effective diameter of the slip ring.

10. A method of attaching a fuel canister to a torch comprising:
    providing a first connector on the canister, said first connector comprising screw threads;
    providing a second connector on the torch, said second connector comprising an opening and a slip ring;
    disposing the opening over the first connector;
    moving the first connector axially without rotating the first connector and second connector relative to one another such that the first connector enters the opening;
    increasing the diameter of the slip ring;
    allowing the slip ring to contract back to a smaller diameter to lock the first connector to the second connector.

11. The method of claim 10 wherein an edge of the first connector contacts the slip ring to increase the diameter of the slip ring.

12. The method of claim 11 wherein said edge is beveled.

13. The method of claim 10 further including manually expanding the slip ring.

14. The method of claim 10 inserting the first connector into the opening until a groove on the first connector is aligned with the slip ring.

15. The method of claim 14 allowing the slip ring to contract causing it to snap into engagement with the groove.

* * * * *